United States Patent [19]

Oka

[11] Patent Number: 4,732,961
[45] Date of Patent: Mar. 22, 1988

[54] EPOXY TYPE SPHERICAL PARTICULATE ADHESIVE AND PROCESS FOR PREPARATION THEREOF

[75] Inventor: Koichiro Oka, Osaka, Japan

[73] Assignee: Toray Industries, Inc., Tokyo, Japan

[21] Appl. No.: 909,058

[22] Filed: Sep. 18, 1986

[30] Foreign Application Priority Data

Sep. 25, 1985 [JP] Japan .................................. 60-211400

[51] Int. Cl.$^4$ ............................................. B05D 1/18
[52] U.S. Cl. ................................. 528/87; 528/88; 528/104; 528/118; 528/119; 528/120; 528/121; 528/122; 528/123; 528/124; 528/111; 523/466
[58] Field of Search ................... 528/87, 88, 104, 118; 523/466

[56] References Cited

U.S. PATENT DOCUMENTS

| 3,102,043 | 8/1963 | Winthrop | 260/47 ED |
|---|---|---|---|
| 3,506,598 | 4/1970 | Groff | 528/87 |
| 4,243,794 | 1/1981 | White | 525/934 |
| 4,251,426 | 2/1981 | McClure | 525/934 |
| 4,269,760 | 5/1981 | Wakimoto | 523/466 |
| 4,588,617 | 5/1986 | Oka | 427/443 |

FOREIGN PATENT DOCUMENTS 57-29031 2/1982 Japan .

Primary Examiner—John Kight
Assistant Examiner—Frederick Krass
Attorney, Agent, or Firm—Armstrong, Nikaido, Marmelstein & Kubovcik

[57] ABSTRACT

A spherical particulate adhesive comprising particles of a partially amine cured epoxy resin as the main component and having an average particle size of 0.3 to 500 μm, in which particles of the epoxy resin contain an at least partially compatible agent homogeneously in the interior thereof. This adhesive is a heat-curable adhesive and has a very high bonding force. After bonding, the adhesive is chemically stable and is especially preferably used for bonding in the field of electronic material, such as liquid crystal display devices, which are apt to be degraded by impurities and for which high-precision bonding is required.

20 Claims, 2 Drawing Figures

EPOXY TYPE SPHERICAL PARTICULATE ADHESIVE AND PROCESS FOR PREPARATION THEREOF

BACKGROUND OF THE INVENTION (1) Field of the Invention

The present invention relates to an epoxy type particulate adhesive which contains a latent curing agent in the interior of the particles and is in the so-called B stage and which is cured by heating and functions as an adhesive, and a process for the preparation of this adhesive. More particularly, the present invention relates to a particulate adhesive which is substantially free of a solvent. It contains a latent curing agent homogeneously in the interior of the particles and is spherical and therefore, can be used especially advantageously for bonding electronic materials which are apt to be degraded by impurities and for which high-precision bonding is required, such as liquid crystal display plates.

(2) Description of the Related Art

Conventional epoxy type powdery adhesives are powdery mixtures of an epoxy resin powder formed by pulverizing an uncured or partially cured epoxy resin and classifying the pulverized resin if necessary and a latent curing agent powder. They are also powdery products obtained by pulverizing an uncured or partially cured epoxy resin with which a latent curing agent has been kneaded in advance and classifying the pulverized resin if necessary.

The conventional technique utilizing the pulverizing method is disadvantageous in that since respective particles are indeterminate in shape, the mobility of the powder is bad and the coating property is insufficient. In the case of bonding two plates, the distance between which is kept uniform by a spacer or the like, all the particles do not completely fill the space between the plates and there are many particles making no contribution to bonding.

A technique of spheroidizing particles formed by pulverization by passing them through a high-temperature atmosphere is known, but in case of particles containing a latent curing agent in the interior thereof, the curing reaction is advanced by this technique and therefore, it often happens that the adhesiveness is drastically degraded in the spheroidized particles.

The specification of U.S. Pat. No. 4,588,617 discloses a technique of forming cured particles having an average diameter smaller than 50 $\mu$m by adding an amine type compound to an uncured epoxy compound emulsion prepared in advance. However, particles prepared according to this technique have no adhesiveness.

Another known technique is disclosed in Japanese Unexamined Patent Publication No. 57-29031, in which glass sheets are bonded and secured by using an encapsulated adhesive. However, this adhesive is poor in the bonding force and has bad influence on liquid crystals, and therefore, this adhesive is not preferred.

SUMMARY OF THE INVENTION

It is a primary object of the present invention to provide a particulate adhesive composed of spherical particles comprising at least an epoxy resin as the main component, in which the epoxy resin contains a latent curing agent homogeneously in the interior of the particles, the average particle size is 0.3 to 500 $\mu$m and the bonding force is high.

Another object of the present invention is to provide an epoxy type particulate adhesive as set forth above, in which the latent curing agent is selected from the group consisting of polycondensation type compounds and phenolic compounds and the normal-temperature stability is high.

Still another object of the present invention is to provide an epoxy type particulate adhesive as set forth above, the surface of which is covered with particles of an inorganic oxide, especially silica sol particles, having an average particle size smaller than 0.2 $\mu$m, whereby the chargeability is reduced and blocking of the adhesive particles is controlled.

Still another object of the present invention is to provide an epoxy type particulate adhesive which can be heat-cured at 80° to 200° C., has an average particle size of 1 to 20 $\mu$m and has such a particle size distribution that particles having a size in the range of from 0.5×(average particle diameter) to 1.5×(average particle diameter) occupy at least 90% by weight of total particles and which can be used especially preferably as a spot adhesive for liquid crystal panels.

A further object of the present invention is to provide a process in which an adhesive having excellent functions as described above can be prepared efficiently.

In accordance with the present invention, these objects can be attained by (1) an epoxy type spherical particulate adhesive comprising at least an epoxy resin as the main component, wherein the epoxy resin contains a latent curing agent in the interior of particles and the average particle diameter is 0.3 to 500 $\mu$m, and (2) a process for the preparation of an epoxy type spherical particulate adhesive comprising at least an epoxy resin as the main component, which comprises emulsifying or suspending an epoxy compound having a latent curing agent incorporated therein into a liquid composed mainly of water to form spherical particles, and (3) a process for the preparation of an epoxy type spherical particulate adhesive comprising at least an epoxy resin as the main component, which comprises mixing an aqueous slurry obtained by emulsifying or suspending an epoxy compound containing a latent curing agent compatibly therein into a liquid composed mainly of water to form spherical particles, with a slurry of fine particles of an inorganic oxide having an average particle diameter smaller than 0.2 $\mu$m, and stirring the mixture to obtain an epoxy type spherical particulate adhesive covered with the inorganic oxide.

DESCRIPTION OF THE PREFERRED EMBODIMENTS

Figure 1:
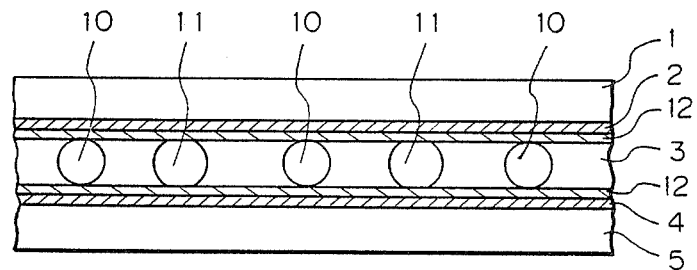
FIG. 1 is a diagram illustrating a main part of one embodiment of the present invention.

The present invention will now be described in detail.

An epoxy compound containing at least two epoxy groups in the molecule is preferred as the epoxy compound used in the present invention. For example, there can be mentioned bisphenol A or condensed bisphenol A diglycidyl ether, polyethylene glycol diglycidyl ether, a polyglycidyl ether of a phenol-novolak compound and N,N,N',N'-tetraglycidyl-m-ethylene-diamine. These compounds may be used singly or in the form of a mixture of two or more of them. Furthermore, a compound having one epoxy group in the molecule, for example, 2-ethylhexyl glycidyl ether, can be used according to need.

Before conversion of the epoxy compound into fine spherical particles, a latent curing agent is added to the epoxy compound. The latent curing agent is a curing agent such that the pot life of an optimum mixing ratio composition (composition showing a highest curing speed) of the curing agent and bisphenol A diglycidyl ether is longer than 1 day at normal temperature.

As examples of the curing agent satisfying this requirement, there can be mentioned dicyandiamide, imidazoles, Lewis acid complexes, phenols, bisphenols, phenol-novolaks, polyvinyl phenols, carboxylic acids, acid anhydrides, acidic polyesters, carboxyl group-containing polymers such as styrene-maleic acid copolymers. Condensation or addition type compounds are preferred as the latent curing agent in the present invention, and phenolic curing agents such as phenol-novolaks, polyvinyl phenols and adducts formed by biphenol diglycidyl ethers or condensates thereof and polyhydric phenols, especially bisphenols, are particularly preferred because the bonding force is high and the storage stability at normal temperature is good.

The epoxy compound and latent curing agent which are at least partially compatible, preferably completely compatible, with each other are advantageously used in the present invention. Compatibilization of the epoxy compound and latent curing agent is accomplished by heat-mixing them within a range not inhibiting attainment of the objects of the present invention or by dissolving them in a common solvent and then removing the solvent by drying under reduced pressure according to need.

In order to attain the objects of the present invention, it is generally preferred that the amount of the latent curing agent be 0.05 to 1 equivalent per equivalent of the epoxy group of the epoxy compound. However, in the case where spherical particles are formed by partially curing emulsion or suspension particles of the mixture of the epoxy compound and latent curing agent with an amine type curing agent in a manner described below, it sometimes happens that a very small amount of the latent curing agent is an optimum amount. Furthermore, in the case where a catalyst type latent curing agent is used, the amount of the curing agent is generally smaller than 20% by weight based on the epoxy compound.

When the epoxy compound is partially cured in the particulate state by an amine type compound, the latent curing agent is separated in the island-like form from the epoxy compound with increase of the polymerization degree of the epoxy compound. However, since the separation state is very fine, the curing action of the latent curing agent is not substantially influenced by this separation. Accordingly, in the present invention, the "compatible" state is defined to include even such a separation state.

Typical instances of the method for spheroidizing a compatible mixture of the epoxy compound and latent curing agent or a partially compatible mixture thereof and forming spherical particles will now be described.

The first method for spheroidizing mechanically pulverized particles of an indeterminate form is through the action of interfacial tension. The particles are heated from the outside to melt at least the surfaces of the particles. Since the particles are united if they hit against each other while their surfaces are in a molten state, it is necessary to keep them from contacting each other in that condition. A typical method for keeping the particles separate from each other involves allowing the particles to drop in a heated gaseous atmosphere or to float in the atmosphere until melted. This can be achieved by a method in which the particles are fed into a cylinder, which is heated from the side wall or into which a hot air is blown, from the upper portion thereof, and dropped by gravity or allowed to float in the cylinder. After being melted and spheroidized, the particles are cooled until they become non-sticky and will not unite with each other.

As another method, there can be mentioned a method in which the mixture of the epoxy compound and latent curing agent is emulsified or suspended in a liquid composed mainly of water to spheroidize the mixture (hereinafter referred to as "second method").

Either of the first and second methods can be used in the present invention, but in view of the uniformity and true sphericity of the particles, the second method is especially preferred. In view of the productivity, a method in which the mixture is emulsified or suspended by using a surface active agent or the like is particularly preferred.

Various means may be adopted for emulsifying or suspending the mixture of the epoxy compound and latent curing agent in an aqueous liquid according to the second method. Typical methods will now be described though the present invention is not limited by these methods.

(1) A method in which the mixture or its solution is continuously extruded from a nozzle shaken in air or a liquid to cut the mixture or solution into drops and these liquid drops are collected in a liquid.

(2) A method in which the mixture or its solution is pulsatively extruded from a nozzle in air or a liquid and collected in a liquid.

(3) A method in which the mixture is emulsified by using a surface active agent.

(4) A method in which the mixture is emulsified by using a powdery emulsifier.

(5) A method in which the mixture is emulsified with water containing a protecting colloidal substance.

Of these methods, the methods (3) through (5) are preferably used in the present invention from the viewpoint of the productivity, but the combination of the methods (1) through (5) is preferably used in the present invention.

In the second method, it must be noted that in the case where the mixture of the epoxy compound and latent curing agent is liquid at normal temperature and the product is used in the form of a dry powder, the mixture should be in the state of spherical particles which are solid at least at normal temperature by partially curing the epoxy compound.

For this purpose, a curing agent other than the latent curing agent is sometimes used. The curing agent and curing method for this purpose are not particularly critical. However, there are preferably adopted the following methods.

(1) A method in which a mixture of the epoxy compound having a curing agent incorporated therein advance and the latent curing agent is emulsified or suspended in a liquid composed mainly of water to effect partial curing in this state.

(2) A method in which a water-soluble amine type curing agent is added to an emulsion or suspension of the mixture of the epoxy resin and latent curing agent in a liquid composed mainly of water to effect partial curing.

In each of the foregoing methods, in order to cure particles in the emulsified or suspended state without bonding of the particles, normal temperature curing is preferred. Accordingly, good results are often obtained if a normal temperature curing type curing agent, especially an amine type curing agent, is used.

In the case where the mixture of the epoxy resin and latent curing agent is solid at normal temperature, there are adopted the following methods.

(1) A method in which the mixture is heated and emulsified in the liquid state into a liquid composed mainly of water and the emulsion is cooled to form solid spherical particles.

(2) A method in which a solution of the mixture in an organic solvent is emulsified in an aqueous liquid and the solvent is removed to form solid spherical particles.

In the latter method, good results are readily obtained if an organic solvent soluble in a liquid composed mainly of water is used.

The method of emulsifying or suspending the mixture of the epoxy compound and latent curing agent in a liquid composed mainly of water by using a surface active agent will now be described.

A surface active agent having an HLB value of at least 10 is preferably used in the present invention. If the HLB value is smaller than 10, the stability of the emulsion or suspension is degraded and a good particulate cured product is not obtained. As examples of the surface active agent preferably used in the present invention, there can be mentioned ether type non-ionic surface active agents such as polyoxyethylene phenol substituted ether type surface active agents and polyoxyethylene/polypropylene block polyether type surface active agents, ester type non-ionic surface active agents such as polyethylene glycol esters of higher fatty acids and polyhydric alcohol esters of fatty acids, and alkoxylated rosins, though surface active agents that can be used in the present invention are not limited to those mentioned above.

The amount used of the surface active agent is important in the present invention. It is preferred that the surface active agent be added in an amount of at least 2% by weight based on the mixture of the epoxy compound and latent curing agent. If the amount of the surface active agent is smaller than 2% by weight, the stability of the emulsion or suspension is degraded and a good particulate product is not obtained. The upper limit of the amount used of the surface active agent is not particularly critical, but in order to prevent reduction of the physical properties of the particles, it is ordinarily preferred that the surface active agent be used in an amount of up to 30% by weight based on the mixture.

Whether emulsification or suspension of a compound is easy or difficult ordinarily depends on the viscosity. In the case where the viscosity of the mixture is high or the mixture is solid at normal temperature, it is difficult to attain sufficient emulsification or suspension only by a mechanical force. In this case, a diluent for the epoxy compound is used together with the surface active agent or the mixture is liquefied by heating.

As the diluent, there can be mentioned ketones, alcohols, cellosolves, dioxane, aromatic hydrocarbons and esters such as ethyl acetate.

A typical emulsifying or suspending method will now be described though the emulsifying or suspending method is not particularly limited to this method.

The mixture containing a surface active agent is heated at normal temperature to 95° C. and water maintained at this temperature is gradually added to the heated mixture with stirring at a high speed.

Other additives may be contained in the interior of particles of the present invention, so far as attainment of the intended objects of the present invention is not inhibited. A typical additive is an organic or inorganic pigment or a dye, which is used, for coloration. Ordinarily, this colorant is added before the mixture is emulsified or suspended in an aqueous liquid. However, spherical particles may be dyed or colored.

In the case where the mixture of the epoxy compound and latent curing agent is liquid at normal temperature, it is preferred that the curing agent be added to the mixture before conversion to emulsified particles or to the emulsion to effect partial curing and form suspended particles.

For this purpose, preferred results can be obtained if a normal temperature curing type curing agent, especially an amine type curing agent described below, is used.

The preferred amine type compound is one characterized in that when a stoichiometrically equivalent amount of the amine is mixed with the epoxy compound at 20° C. and the mixture is allowed to stand still at 20° C. for 8 hours, the Shore A hardness of the mixture is at least 50.

If the Shore A hardness is lower than 50, the curability of the emulsified particles is reduced and a good particulate product is not obtained.

As the curing agent used in the present invention, there can be mentioned piperazine, hydrazine, polyethylene polyamines such as ethylene diamine, diethylene triamine and triethylene tetramine, alcohol amines such as monoethanol amine, and N-(2-aminoethyl)piperazine, though amines that can be used in the present invention are not limited to those exemplified above.

In the present invention, it is especially preferred that the amine type curing agent satisfying the requirement of the Shore A hardness be added to the emulsion or suspension.

A monovalent amine such as diethylamine may be used for reducing the polymerization degree, and especially good results can be obtained when a piperazine or hydrazine compound is used in combination with it.

The amount used of the curing agent is changed according to the intended particle size of the particles, the time of addition of the curing agent and the concentration of the emulsion or suspension, but if the amount used of the curing agent is too small, particles which are solid at normal temperature cannot be obtained, and if the amount used of the curing agent is too large, the melting point (softening point) becomes too high and the bonding force is readily degraded. It is generally preferred that the curing agent be used in an amount of 0.1 to 0.6, equivalent based on the epoxy compound. In the case where the curing agent is added to the emulsion or suspension, since the curing reaction is heterogeneous, geneous, the reaction efficiency is low and sometimes poor results are obtained even if the curing agent is used in an amount of 1 equivalent or more.

When the amine type curing agent is added to the emulsion or suspension, there is ordinarily adopted a method in which the curing agent is added directly or in the form of an aqueous solution.

In the second method, in order to prevent bonding and integration of particles, it is preferred that curing reaction be carried out under standing or gentle stirring (1) after formation of the emulsion or suspension in the case where the curing agent is added to the mixture of the epoxy compound and latent curing agent and the mixture is emulsified or suspended or (2) after addition of the curing agent in the case where the mixture of the epoxy compound and latent curing agent is emulsified or suspended and the curing agent is added to the emulsion or suspension.

The suspension after solidification is neutralized with a mineral acid or the like according to need and particles are separated from the aqueous liquid by filtration or the like, washed and air-dried or dried at a low temperature, whereby dry particles can be withdrawn without reduction of the bonding force.

A good adhesive is often obtained in the present invention when the average diameter of particles is 0.3 to 500 μm, preferably 0.5 to 300 μm. If the particle size is too small and below the above-mentioned range, the bonding force is reduced, and if the particle size is too large and exceeds the above-mentioned range, the scattering and coating property is likely degraded.

The epoxy type spherical particulate adhesive of the present invention is preferably used as a spot adhesive for a liquid crystal electric optical element. In this case, a powder having an average particle size of 1 to 20 μm, especially a powder having such a particle size distribution that particles having a size of from 0.5×(average particle size) to 1.5×(average particle size) occupy at least 90% by weight of total particles, is preferred. In case of excessively small particles, the gap between glass sheets or films in which a liquid crystal is sealed cannot be sufficiently filled and bonding becomes insufficient. In case of too large particles, bonding can be accomplished but the presence of the particles on the display surface of the liquid crystal is observed and the appearance characteristic is degraded.

Various means such as the suspension filtration method, the elutriation method utilizing centrifugal separation or natural sedimention, the air elutriation method and the gas cyclone method can be adopted for sharpening the particle size distribution. Ordinarily, the elutriation method is excellent in the classifying capacity and precision.

When the suspension of the epoxy type spherical particulate adhesive is dried, especially if the average particle size is small, blocking is readily caused in dried particles. Furthermore, since the chargeability of dried particles is strong, when the particles are charged into a vessel or transferred or applied to an adherent, the particles are scattered and the operation becomes difficult. These disadvantages are effectively obviated by a method in which the surfaces of the epoxy type spherical particles are covered by adsorption with inorganic oxide particles having an average particle size smaller than 0.2 μm, especially fine particles of inorganic oxides showing an anionic property, such as oxides of silicon, aluminum and titanium. In this case, it is preferred that the amount of the inorganic oxide particles be 0.05 to 5% by weight on the epoxy type spherical particles. If the amount of the inorganic oxide particles is too small and below the above-mentioned range, the effect of preventing blocking or charging is low, and if the amount is too large and exceeds the above-mentioned range, reduction of the bonding force is caused.

A method in which a suspension of the fine inorganic oxide particles and a suspension of the epoxy type spherical particles are mixed together is most preferred for adsorbing and covering the fine inorganic oxide particles on the epoxy type spherical particles.

If both the suspensions are in the state where respective particles are independently dispersed without agglomeration, the surfaces of the epoxy spherical particles are most uniformly covered with the inorganic oxide particles. Accordingly, a method in which a suspension of the epoxy type spherical particles and a suspension of the inorganic oxide particles, which are not dried at all, are used is most preferred. As the combination of these suspensions, there can be mentioned a combination of suspension of a product formed by partially curing epoxy type spherical particles according to the second method, especially by an amine type curing agent, and silica sol.

It is preferred that this covering treatment with inorganic oxide particles be carried out after the epoxy type spherical particles have been classified.

One of the uses of the epoxy type spherical particulate adhesive will now be described.

Namely, the structure of a liquid crystal panel in which the adhesive of the present invention is filled is now described with reference to the accompanying drawings. FIG. 1 is a diagram illustrating a main part of one embodiment of the present invention. An electroconductive coat layer 2 is formed on the surface of a glass or plastic sheet or monoaxially oriented film 1 as a top plate, and a transparent electrode 4 is formed on the surface of a glass or plastic sheet or film 5 as a lower plate. Particles 10 as a spacer keep a distance between the top and lower plates, and adhesive particles 11 of the present invention bond the top and lower plates in the state where the upper and lower contact portions of the particles 11 are somewhat crushed. Reference numeral 3 represents a liquid crystal.

Figure 2:
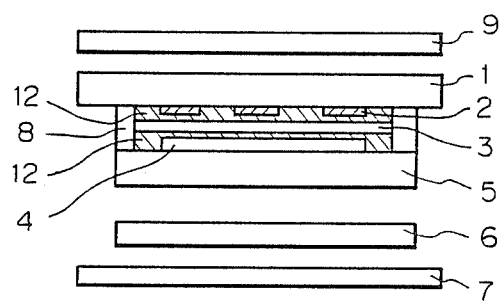
FIG. 2 is a diagram illustrating the entire structure of the embodiment of the present invention.

FIG. 2 shows the entire structure of the embodiment of the present invention. Explanation of the members shown in FIG. 1 is omitted. Reference numerals 6, 7, 8, 9 and 12 represent a polarizing plate, a reflecting plate, a sealing material, a polarizing plate and alignmental film, respectively.

The adhesive particles of the present invention are crushed and act as a cushioning member for preventing the spacer particles from being destroyed by convexities of the substrate. The adhesive particles also serve to attract the concavities of the substrate toward the confronting substrate by bonding, whereby a uniform space is realized.

Adhesive particles comprising a phenolic curing agent, especially an adduct of a condensed or uncondensed bisphenol glycidyl ether and a bisphenol, is particularly effective for preventing contamination or breaking of the orientation coat layer.

In the above-mentioned structure, even if there are present certain convexities and concavities (ordinarily about 20 to about 30 μm) on the substrates 1 and 5, by effecting bonding by pressing under heating, a certain distance can be maintained between the substrates. Namely, the convexities and concavities of about 20 to about 30 μm can be corrected.

If heating is continued in this state, the adhesive particles 11 of the present invention are crushed and are cured in the state fusion-bonded to the two substrates 1 and 5.

The two substrates 1 and 5 are secured while they receive a force of attracting them to each other by the sealing material 8 and the adhesive particles 11 but the inward movement is regulated by the spacer particles 10, whereby a cell is formed.

The adhesive particles 11 exert a cushioning action at the press-bonding step and prevent the spacer particles 10 from being crushed and broken by convexities of the undulated substrates.

In the case where the adhesive particles 11 comprises a phenolic curing agent, a contaminant reaction gas is not generated at the curing reaction and hence, the alignmental film is not deteriorated. Accordingly, an electric optical element having a good contrast ratio can be obtained. Furthermore, since the adhesive particles 11 are chemically stable, the liquid crystal is not modified or deteriorated even if the liquid crystal is used for a long time, and the durability characteristic is highly improved.

When the adhesive particles of the present invention are used for a liquid crystal panel, the amount used of the adhesive particles is about 0.1 to about 50 mg per 100 $cm^2$ of the panel. Since the diameter of the particles is much smaller than the size of the image elements, even if the adhesive particles are used in such an amount as described above, no substantial disturbance is caused in a displayed image and no bad influences are imposed on the human eyes.

The present invention will now be described in detail with reference to the following examples that by no means limit the scope of the invention.

EXAMPLE 1

A polyethylene cup having a capacity of 100 cc was charged with 5 g of Epikote 828 and 5 g of Epikote 1001, each being a commercially available bisphenol A diglycidyl ether type epoxy resin supplied by Yuka-Shell Epoxy, and 1 g of Noigen EA-137 (supplied by Daiichi Kogyo Seiyaku), which is a commercially available polyoxyethylene phenol substituted ether type surface active agent having an HLB value of 13, was added. Furthermore, 1 g (corresponding to about 0.12 equivalent) of Epicure 171N (supplied by Yuka-Shell Epoxy), which is an adduct of condensed bisphenol A diglycidyl ether and bisphenol A, was added, and the entire mixture was heated at 90° C. and promptly stirred to form a transparent compatible liquid. The liquid was immediately stirred at 800 rpm for 1 minute by a stirrer having a Teflon plate vane attached to the top end thereof so that the temperature was not lowered. Subsequently, 6 cc of water contained in a syringe was gradually added at intervals of 1 minute by 1.5 cc at each time with stirring. A milky white emulsion was obtained in the polymer cup.

A curing liquid formed by diluting 0.44 equivalent of piperazine with 8 cc of water was added to the emulsion and the mixture was gently stirred to uniformalize the emulsion.

The emulsion was allowed to stand still at 25° C. for 6 days to obtain spherical particles having an average particle size of about 4.9 $\mu$m.

The particles were recovered by filtration and dried, and they were placed on a slide glass and treated at 140° C., whereby the particles were rendered transparent and integrated. Separately, 10 mg of the particles were uniformly scattered on a slide glass [75 mm×25 mm×1 mm (thickness)] in a region of 30 mm from one end, and the particle-scattered area was covered by another slide glass and both the slide glasses were fixed by an adhesive cellophane tape. The assembly was heat-treated for 8 hours by a hot air drier maintained at 140° C. Then, the bonded structure was taken out and bent by the hands. The bonded portion was not broken but the slide glasses were broken in other portions.

EXAMPLE 2

A polyethylene cup having a capacity of 300 cc was charged with 40 g of Epikote 828 used in Example 1, and 4 g of Emulgit 9 (supplied by Daiichi Kogyo Seiyaku), which is a polyoxyethylene nonylphenyl ether having an HLB value of 16.2, and 12 g (about 0.26 equivalent) of Epicure 171N, which is the same latent curing agent as used in Example 1, were added, and the mixture was heated at 90° C. to form a transparent compatible liquid. The mixture was cooled to normal temperature and an emulsion was prepared in the same manner as described in Example 1 by using 24 cc of water as a whole.

An aqueous solution of about 0.31 equivalent of piperazine in 32 cc of water was added to this emulsion and partial curing was carried out in the same manner as described in Example 1 to obtain spherical particles having an average particle size of 19.2 $\mu$m.

When the bonding force was manually tested by using slide glasses in the same manner as described in Example 1, the bonded portion was not broken but the slide glasses were broken in other portions.

EXAMPLE 3

The curing liquid-containing slurry of epoxy type spherical particles obtained in Example 1 was diluted to form a suspension having a solid content of 5% by weight. Then, silica sol (Snowtex N supplied by Nissan Kagaku) was added to the suspension, and the mixture was stirred for 30 minutes, and particles were recovered by filtration, washed and dried at normal temperature under reduces pressure.

To measure a tear bonding strength, 0.5 mg of the particles were uniformly scattered on a square region having a side of 15 mm on a slide glass and the scattered region was covered by a slide glass having the same size as that of the above-mentioned glass. The slide glasses were secured by clips and were subjected to the curing treatment for 2 hours in a hot air drier maintained at 170° C. The relations of the amount adsorbed of the silica to the blow-off charge quantity, the tear bonding strength and the blocking-preventing effect are shown in Table 1.

TABLE 1

| Silica (% by weight) | Blow-off Charge Quantity* ($\mu$c/g) | Tear Bonding Strength (Kg/15 mm) | Blocking-Preventing Effect |
| --- | --- | --- | --- |
| 0 | 130 | 50 | blocking |
| 0.5 | 60 | 50 | good |
| 2 | 15 | 40 | good |

Note
*quantity of charge by friction with iron powder

EXAMPLE 4

A polyethylene cup having a capacity of 100 cc was charged with 5 g of Epikote 828, 5 g of Epikote 1001 and 1 g of Emulsit 9 as a surface active agent, and they were melt-mixed at 95° C. The molten mixture was cooled to 50° C. and 0.5 g of Curesol 2E4MZ-CN (imidazole type latent curing agent supplied by Shikoku Kasei) was added, and they were melt-mixed to obtain a transparent mixture.

While the mixture was stirred at 800 rpm, 1.5 cc of water at 50° C. was added and the mixture was stirred for 40 seconds at a temperature maintained at 50° C. This operation was repeated 4 times, and emulsification was effected by 6 cc of water as a whole.

A curing liquid formed by diluting 0.3 equivalent of piperazine with 8 cc of water was added to the emulsion, and partial curing was effected with gentle stirring at 20° C. for 4 days to obtain spherical particles having an average particle size of 4.5 μm. The particles were dried at normal temperature under reduced pressure, and when the tear bonding strength was measured in the same manner as described in Example 3, it was found that the tear bonding strength was 23 Kg/15 mm.

EXAMPLE 5

An epoxy resin adhesive liquid was coated in a thickness of about 7 μm on the surface of the peripheral region of a glass substrate having a transparent electrode coat layer and a rubbed or unrubbed polyimide alignment film as an orientation coat to form a sealing portion. An epoxy type spherical particulate adhesive (having a composition described below) having a diameter of 5.5 μm and fine particles of alumina having a diameter of 2 μm were scattered at predetermined densities (for example, 200 particles per mm$^2$) on the inner region surrounded by the sealing portion. Another glass substrate was piled on the glass substrate, and the assembly was heated at an elevated temperature (for example, 80° to 200° C.) under a pressure (for example, 0.3 to 5 Kg/cm$^2$). A cell structure comprising the glass substrates secured in parallel with a space of 2 μm was thus obtained.

A ferroelectric chiral smectic liquid crystal (for example, p-desiloxybenzylidene-p'-amino-2-methylbutyl cinnamate) was injected into the formed cell, and the cell was driven and the ratio of the contrast at the time of transmission of light to the contrast at the time of interception of light was measured. The contrast ratio was 5.5 to 6.5. Accordingly, it was confirmed that the contrast ratio was sufficiently high and the orientation state of the liquid crystal was not disturbed.

Specific examples of the epoxy type spherical particulate adhesive are described below.

Adhesive 1

A polyethylene cup having a capacity of 300 cc was charged with 20 g of Epikote 828 and 20 g of Epikote 1001 as the epoxy resin, and 4 g of Emulsit 9 as the surface active agent was added and 4 g (about 0.12 equivalent) of Epicure 171N as the latent curing agent was added. The entire mixture was heated at 95° C. and promptly stirred to form a transparent compatible liquid.

A stirrer having a Teflon plate vane attached to the top end thereof was set in the cup, and the liquid was stirred at 800 rpm at a temperature maintained at 50° C. Then, 6 cc of water contained in a syringe and maintained at 50° C. was added and the mixture was stirred for 40 seconds. This operation was repeated 4 times. Thus, the mixture of the epoxy resin and Epicure 171N was emulsified by 24 cc of water as a whole.

A curing liquid formed by diluting 0.44 equivalent of piperazine with 32 cc of water was added to the emulsion and the mixture was gently stirred to uniformalize the emulsion.

The emulsion was allowed to stand still at 25° C. for 6 days to obtain spherical particles having an average particle size of about 6 μm.

Water classification (elutriation) was carried out to obtain such a particle size distribution that particles having a size of 5.5±2 μm occupied 95% by weight of total particles.

Silica sol (Snowtex N, solid content of 40% of by weight) was added in an amount of 2.5% by weight based on the particles to the classified particle suspension, and the mixture was stirred for 30 minutes to make silica adsorbed on the particles.

The particles were recovered by suction filtration and dried at normal temperature under reduced pressure. The tear bonding strength was measured in the same manner as described in Example 3. It was found that the tear bonding strength was 40 Kg/15 mm.

Adhesive 2

A polyethylene cup having a capacity of 300 cc was charged with 40 g of Epikote 828, 12 g (about 0.26 equivalent) of Epicure 171N as the latent curing agent and 4 g of Noigen EA137 as the surface active agent, and they were heat-mixed at 95° C. to obtain a transparent compatible liquid. The liquid was emulsified in the same manner as described in Adhesive 1 except that the emulsifying temperature was normal temperature.

A curing liquid formed by diluting 0.3 equivalent of piperazine with 32 cc of water was added to the emulsion and the mixture was gently stirred to uniformalize the emulsion.

The emulsion was allowed to stand still at 25° C. with gentle stirring at about 1 to about 3 rpm for 4 days to obtain spherical particles having an average particle size of 6.5 μm.

In the same manner as described in Adhesive 1, water classification was carried out so that particles having a size of 5.5±2 μm occupied 95% by weight of total particles, and in the same manner as described in Adhesive 1, 1% by weight of silica was adsorbed on the particles.

After drying under reduced pressure, the particles had a tear bonding strength of 35 Kg/15 mm.

Adhesive 3

The following curing agents were used as the phenolic curing agent to be contained in the epoxy type spherical particulate adhesive. In each case, a good contrast ratio was obtained.

Methylon 75/08 supplied by G-E
Resimene P97 supplied by Monsanto
Varcom 1281B supplied by Varcom
Super-Beckacite supplied by Japanese Reichhold
  Hitanol 4010 and Hitanol 4020 supplied by Hitachi Kasei

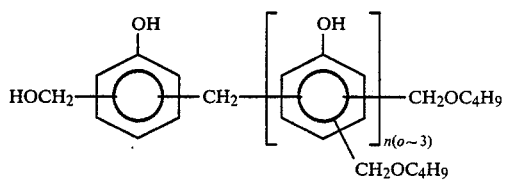

EXAMPLE 6

In 80 g of ethyl alcohol were dissolved 72 g of Epikote 828 and 8 g (about 0.16 equivalent) of a novolak type latent curing agent (Sumilite Resin supplied by Sumitomo-Dures), and the solvent was removed at 50° to 60° C. under reduced pressure.

A polyethylene cup having a capacity of 300 cc was charged with 40 g of the resulting transparent mixture comprising Epikote 828 and Sumilite Resin at a ratio of 9/1.

A solution of 6 g of polyvinyl alcohol (Gosenol GL-05 supplied by Nippon Gosei Kagaku) in 34 g of water was used for emulsifying the above mixture. Namely, the aqueous solution of polyvinyl alcohol was added at intervals of 1 minute 10 g by 10 g to the mixture stirred at 800 rpm.

A curing liquid formed by diluting 0.26 equivalent of piperazine with 32 cc of water was added to the emulsion and the mixture was gently stirred at 25° C. for 4 days to effect partial curing and obtain spherical particles having an average particle size of 10 μm.

Classification was carried out by elutriation so that particles having a size of 12±3 μm occupied 95% by weight of total particles, and silica sol Snowtex N (solid content of 40% by weight) was added in an amount of 1.25% by weight based on the particles and the mixture was stirred for 30 minutes and dried at normal temperature under reduced pressure. The tear bonding strength measured in the same manner as described in Example 3 was 15 Kg/15 mm.

On one surface of a monoaxially oriented polyethylene terephthalate film (draw ratio of 5.5) having a thickness of 100 microns, vacuum evaporation deposition was carried out by resistance-heating an evaporation source comprising metallic indium and metallic tin (metallic tin content of 12% by weight), which was charged in a tungsten boat, under a high vacuum ($2 \times 10^{-2}$ Torr) in an oxygen atmosphere. The thickness of the obtained electroconductive coat layer was 850 Å. Then, the film was subjected to an oxidizing heat treatment at 150° C. for 20 minutes to obtain a transparent film having a sheet resistivity of 50 Ω. Then, alignment film was formed on the electroconductive coat layer.

By using the so-obtained electroconductive film as the top plate, a pulverized glass fiber having a size of 7±0.3 μm as the spacer and the above-mentioned epoxy type spherical particles as the adhesive, cure-bonding was carried out at 150° C. A good cell heretofore not obtainable, in which an iridescent pattern was not formed even by bending the surface, was obtained without any damage being formed on the electroconductive coat layer or the alignmental film.

I claim:

1. An epoxy spherical particulate adhesive comprising particles of a partially amine cured epoxy resin as the main component, wherein the epoxy resin contains an at least partially compatible latent curing agent in the interior of the particles, the average particle diameter is 0.3 to 500 μm, and substantially all the epoxy resin particles are spherical.

2. An epoxy spherical particulate adhesive as set forth in claim 1, wherein the latent curing agent is a condensation or addition type compound.

3. An epoxy spherical particulate adhesive as set forth in claim 1, wherein the latent curing agent is a phenolic compound.

4. An epoxy spherical particulate adhesive as set forth in claim 3, wherein the latent curing agent is an adduct of a bisphenol diglycidyl ether or a condensation product thereof and a polyhydric phenol compound.

5. An epoxy spherical particulate adhesive as set forth in claim 1, wherein the amount of the latent curing agent is 0.05 to 1 equivalent.

6. An epoxy spherical particulate adhesive as set forth in claim 1, wherein the surfaces of the epoxy type spherical particles are covered with fine particles of an inorganic oxide having an average particle diameter smaller than 0.2 μm.

7. An epoxy spherical particulate adhesive as set forth in claim 6, wherein the inorganic oxide is silicon oxide.

8. An epoxy spherical particulate adhesive as set forth in claim 6, wherein the fine particles of the inorganic oxide are present in an amount of 0.05 to 5% by weight based on the epoxy type spherical particles.

9. An epoxy spherical particulate adhesive as set forth in claim 1, wherein the epoxy type spherical particles have such a property that the epoxy type spherical particles can be cured by heating at 80° to 200° C.

10. An epoxy spherical particulate adhesive as set forth in claim 1, wherein the average particle diameter of the epoxy type spherical particles is 1 to 20 μm.

11. An epoxy spherical particulate adhesive as set forth in claim 1, wherein the epoxy type spherical particles have such a particle size distribution that particles having a diameter of from 0.5×(the average particle diameter) to 1.5×(the average particle diameter) occupy at least 90% by weight of total particles.

12. A process for the preparation of an epoxy spherical particulate adhesive comprising a partially amine cured epoxy resin as the main component, which comprises emulsifying or suspending an epoxy compound having a latent curing agent incorporated therein into a liquid composed mainly of water to form spherical particles.

13. A process for the preparation of an epoxy spherical particulate adhesive according to claim 12, wherein the latent curing agent is a condensation or addition type compound.

14. A process for the preparation of an epoxy spherical particulate adhesive according to claim 13, wherein the latent curing agent is a phenolic compound.

15. A process for the preparation of an epoxy spherical particulate adhesive according to claim 14, wherein the latent curing agent is an adduct of a bisphenol diglycidyl ether or a condensation product thereof and a polyhydric phenol compound.

16. A process for the preparation of an epoxy spherical particulate adhesive comprising a partially amine cured epoxy resin as the main component, which comprises mixing an aqueous slurry obtained by emulsifying or suspending an epoxy compound containing a latent curing agent compatibly therein into a liquid composed mainly of water to form spherical particles, with a slurry of fine particles of an inorganic oxide having an average particle diameter smaller than 0.2 μm, and stirring the mixture to obtain an epoxy type spherical particulate adhesive covered with the inorganic oxide.

17. A process for the preparation of an epoxy spherical particulate adhesive according to claim 16, wherein the latent curing agent is a condensation or addition type compound.

18. A process for the preparation of an epoxy spherical particulate adhesive according to claim 16, wherein the latent curing agent is a phenolic compound.

19. A process for the preparation of an epoxy type spherical particulate adhesive according to claim 21, wherein the latent curing agent is an adduct of a bisphenol diglycidyl ether or a condensation product thereof and a polyhydric phenol compound.

20. A process for the preparation of an epoxy spherical particulate adhesive according to claim 16, wherein the slurry of the fine particles of the inorganic oxide is silica sol.

* * * * *

UNITED STATES PATENT AND TRADEMARK OFFICE
CERTIFICATE OF CORRECTION

PATENT NO. : 4,732,961

DATED : March 22, 1988

INVENTOR(S) : Koichiro OKA

It is certified that error appears in the above-identified patent and that said Letters Patent is hereby corrected as shown below:

Column 14, Claim 14, line 44, "claim 13" should read --claim 12--.

Column 15, Claim 19, line 2, "claim 21" should read --claim 18--.

Signed and Sealed this

Ninth Day of May, 1989

Attest:

DONALD J. QUIGG

*Attesting Officer*     *Commissioner of Patents and Trademarks*